(12) United States Patent
Jeon et al.

(10) Patent No.: US 12,260,666 B2
(45) Date of Patent: Mar. 25, 2025

(54) APPARATUS AND METHOD FOR IDENTIFYING CONDITION OF ANIMAL OBJECT BASED ON IMAGE

(71) Applicant: INTFLOW INC., Gwangju (KR)

(72) Inventors: Kwang Myung Jeon, Gwangju (KR); In Chul Ryu, Gwangju (KR)

(73) Assignee: INTFLOW INC., Gwangju (KR)

( * ) Notice: Subject to any disclaimer, the term of this patent is extended or adjusted under 35 U.S.C. 154(b) by 479 days.

(21) Appl. No.: 17/702,417

(22) Filed: Mar. 23, 2022

(65) Prior Publication Data

US 2023/0049090 A1 Feb. 16, 2023

(30) Foreign Application Priority Data

Aug. 10, 2021 (KR) .................. 10-2021-0105322

(51) Int. Cl.
| | |
|---|---|
| *G06V 40/10* | (2022.01) |
| *A01K 29/00* | (2006.01) |
| *G06T 7/00* | (2017.01) |
| *G06T 7/73* | (2017.01) |
| *G06V 10/44* | (2022.01) |

(Continued)

(52) U.S. Cl.
CPC ............. *G06V 40/10* (2022.01); *A01K 29/00* (2013.01); *G06T 7/0012* (2013.01); *G06T 7/73* (2017.01); *G06V 10/457* (2022.01); *G06V 10/46* (2022.01); *G06V 10/764* (2022.01); *G06V 10/774* (2022.01); *G06V 10/82* (2022.01);

(Continued)

(58) Field of Classification Search
CPC ...... G06V 40/10; G06V 10/457; G06V 10/82; G06V 10/774; G06V 10/764; G06V 10/46; G06V 20/53; G06V 40/103; G06T 7/73; G06T 7/0012; G06T 2207/30188; G06T 2207/30232; G06T 2207/20081; G06T 2207/20084; A01K 29/00; A01K 29/005; G06F 18/214
See application file for complete search history.

(56) References Cited

U.S. PATENT DOCUMENTS

| | | | |
|---|---|---|---|
| 2017/0046567 A1* | 2/2017 | Hong | .................. A61B 5/167 |
| 2019/0087965 A1* | 3/2019 | Datta | .................. G06T 7/251 |

(Continued)

FOREIGN PATENT DOCUMENTS

| | | | | |
|---|---|---|---|---|
| CN | 110929649 A | * | 3/2020 | ............... G06K 9/00 |
| KR | 101899241 | | 9/2018 | |

(Continued)

*Primary Examiner* — Xuemei G Chen
(74) *Attorney, Agent, or Firm* — CANTOR COLBURN LLP

(57) ABSTRACT

An image-based animal object condition identification apparatus includes: a communication module that receives an image of an object; a memory that stores therein a program configured to extract animal condition information from the received image; and a processor that executes the program. The program extracts continuous animal detection information of each object by inputting the received image into an animal detection model that is trained based on learning data composed of animal images and determines predetermined animal condition information for each class of each animal object by inputting the continuous animal detection information of each object into an animal condition identification model.

15 Claims, 10 Drawing Sheets

(51) Int. Cl.
  *G06V 10/46*  (2022.01)
  *G06V 10/764* (2022.01)
  *G06V 10/774* (2022.01)
  *G06V 10/82*  (2022.01)

(52) U.S. Cl.
  CPC ............. *G06T 2207/30188* (2013.01); *G06T 2207/30232* (2013.01)

(56) References Cited

U.S. PATENT DOCUMENTS

| | | | | |
|---|---|---|---|---|
| 2019/0340432 | A1* | 11/2019 | Mousavian | G06K 9/00 |
| 2020/0167606 | A1* | 5/2020 | Wohlhart | G06K 9/62 |
| 2020/0337272 | A1* | 10/2020 | Kumar | G06V 20/00 |
| 2020/0410669 | A1* | 12/2020 | Psota | G06T 7/0012 |
| 2021/0076643 | A1* | 3/2021 | Persaud | G06V 10/82 |
| 2021/0153479 | A1* | 5/2021 | Mindel | G06V 10/22 |
| 2021/0256386 | A1* | 8/2021 | Wieman | G06N 3/044 |
| 2022/0101117 | A1* | 3/2022 | Cherubini | G06N 3/082 |
| 2022/0159934 | A1* | 5/2022 | Molloy | A01K 29/005 |
| 2022/0392017 | A1* | 12/2022 | Datta | G06T 7/194 |

FOREIGN PATENT DOCUMENTS

| | | | | |
|---|---|---|---|---|
| KR | 102172347 | | 10/2020 | |
| KR | 20210049655 | | 5/2021 | |
| KR | 20210066710 | | 6/2021 | |
| WO | WO-2020003310 | A1 * | 1/2020 | ............. G06T 7/174 |

\* cited by examiner

FIG. 3C

|  | Cow | Pig |
|---|---|---|
| Condition | 0 Stop<br>1 Walk<br>2 Run<br>3 Limp<br>4 Delivery<br>5 Excretion<br>6 Heat<br>7 Fell over<br>8 Stuck | 0 Stop<br>1 Walk<br>2 Run<br>3 Limp<br>4 Delivery<br>5 Excretion<br>6 Biting<br>7 Nose Rubbing |

FIG. 4

| ATTRIBUTE | FORM | VARIABLE | RANGE |
|---|---|---|---|
| rbbox | {xc, yc, w, h, theta} | $R$ | xc, yc, w, h = [COORDINATE RANGE]<br>theta = [-pi/2~pi/2] |
| keypoint | {(x1,y1), (x2,y2), ... (xn,yn)} | $K$ | COORDINATE RANGE |
| class | c | $c$ | CLASS INDEX, INTEGER OF 0 OR MORE |
| pose | p | $p$ | CLASS INDEX, INTEGER OF 0 OR MORE |

APPARATUS AND METHOD FOR IDENTIFYING CONDITION OF ANIMAL OBJECT BASED ON IMAGE

TECHNICAL FIELD

The present disclosure relates to an apparatus and method for identifying the condition of an animal object based on an image.

BACKGROUND

With recent advances in image processing and various IT technologies, a system capable of automatically monitoring the condition of an animal in a shed or the like is being actively developed. In particular, a technique of automatically recognizing each animal object and automatically classifying the behavior of the animal object by using CCTV images is being developed.

However, it is difficult to accurately detect a plurality of dynamically moving animals by such an image processing technique alone.

According to a conventional technology known as a universal object detection technology, detection information about an object of interest is represented by an axis-aligned bounding box. Such a bounding box can usually be used to detect an animal object in most cases. However, if the object is d with an axis, a broad background area, which does not actually correspond to the object, can be overestimated as an object area. In particular, if a plurality of animals of the same class is crowded and overlaps each other, a detection area for each animal may be overestimated, which may result in a great decrease in detection accuracy for each of the crowded animals.

In a general method of measuring the conditions of livestock animals raised in a shed, a farmer or a manager directly observes each of the livestock animals and records observation data and determines the health condition of each livestock animal personally based on the observation data or consults a livestock expert or a veterinarian.

In this regard, Korean Patent No. 10-2172347 (entitled "Method and system for determining health status of farm livestock") discloses a method for checking the health condition of each livestock animal by setting a reference line based on an image.

However, according to the conventional technology, an image taken at an arbitrary reference time with a camera installed at a farm is analyzed to extract an outline of each livestock animal, each livestock animal is sorted by using the extracted outline, and a reference line is determined for each sorted livestock animal. That is, the conventional technology is a technology for evaluating the health condition of a livestock animal as one of normal and abnormal by using the determined reference line. In other words, checking the health condition just by setting a reference line has low accuracy, and the conventional technology makes it possible to check only a simple health condition of a livestock animal.

To solve this problem, the present disclosure proposes a method by which time series information about a position and pose of a livestock animal in an image is generated to train a deep learning model and the current condition of the livestock animal is identified using the trained deep learning model.

SUMMARY

In view of the foregoing, the present disclosure is conceived to provide an apparatus and method for identifying the condition of an animal object based on an image by which a bounding box trained to be suitable for the animal object is used to extract animal detection information, and, thus, animal condition information can be output.

However, the problems to be solved by the present disclosure are not limited to the above-described problems. There may be other problems to be solved by the present disclosure.

A first aspect of the present disclosure provides an image-based animal object condition identification apparatus including: a communication module that receives an image of an object; a memory that stores therein a program configured to extract animal condition information from the received image; and a processor that executes the program. The program extracts continuous animal detection information of each object by inputting the received image into an animal detection model that is trained based on learning data composed of animal images and determines predetermined animal condition information for each class of each animal object by inputting the continuous animal detection information of each object into an animal condition identification model. The animal detection information is extracted from n number of continuous entire images including at least one animal object, and includes n number of continuous object images and n number of continuous object detection data corresponding to the respective object images.

A second aspect of the present disclosure provides a method for identifying a condition of an animal object based on an image by using an image-based animal object condition identification apparatus, including: receiving an image of an object; extracting continuous animal detection information of each object by inputting the received image into an animal detection model that is trained based on learning data composed of animal images; and outputting predetermined animal condition information for each class of each animal object by inputting the continuous animal detection information of each object into an animal condition identification model. The animal detection information is extracted from n number of continuous entire images including at least one animal object, and includes n number of continuous object images and n number of continuous object detection data corresponding to the respective object images.

According to an embodiment of the present disclosure, unlike the conventional object detection technology, a bounding box can be used to extract animal detection information from n number of continuous entire images, and, thus, it is possible to greatly improve detection accuracy for crowded livestock.

Also, according to an embodiment of the present disclosure, unlike a technology of identifying the condition of a livestock animal using only one static datum, animal condition information is output using dynamic data, and, thus, it is possible to more accurately identify abnormal conditions of livestock animals.

Further, according to an embodiment of the present disclosure, animal condition information is accumulatively recorded, and, thus, a manger can efficiently monitor records of abnormal condition of each animal object. Furthermore, according to an embodiment of the present disclosure, it is possible to implement various applications for monitoring an animal object such as sending a notice to a manager in case of abnormal condition (being stuck, collapse, delivery, etc.) of a livestock animal.

BRIEF DESCRIPTION OF THE DRAWINGS

In the detailed description that follows, embodiments are described as illustrations only since various changes

FIG. 3B and FIG. 3C are provided to explain an animal condition identification model of the image-based animal object condition identification apparatus according to an embodiment of the present disclosure.

FIG. 4 and FIG. 5 are provided to explain animal detection information extracted by the animal detection model of the image-based animal object condition identification apparatus according to an embodiment of the present disclosure.

DETAILED DESCRIPTION

Figure 1:
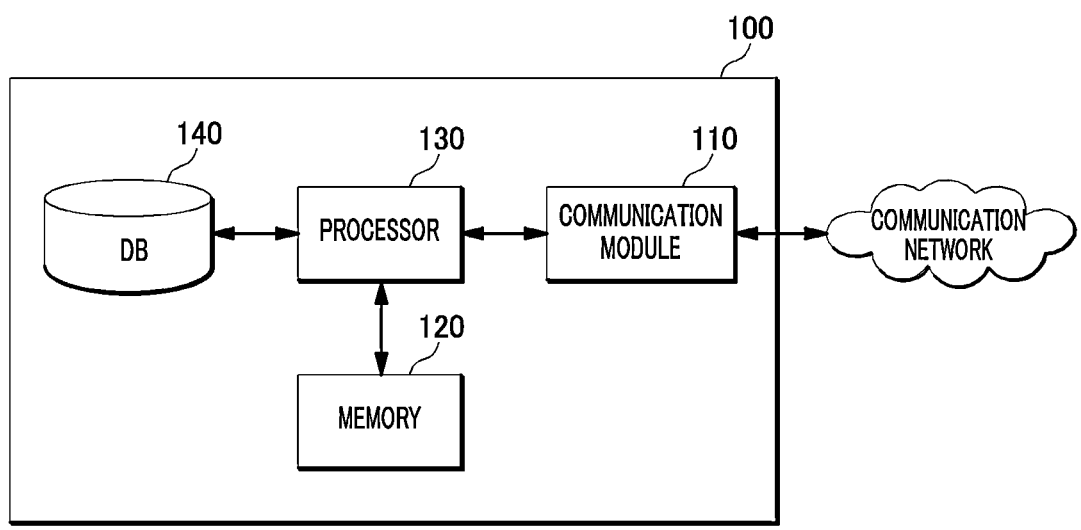
FIG. 1 is a block diagram illustrating a configuration of an image-based animal object condition identification apparatus according to an embodiment of the present disclosure.

Hereafter, embodiments of the present disclosure will be described in detail with reference to the accompanying drawings. However, it is to be noted that the present disclosure is not limited to the embodiments but can be embodied in various other ways. Also, the accompanying drawings are provided to help easily understand the embodiments of the present disclosure and the technical conception described in the present disclosure is not limited by the accompanying drawings. In the drawings, parts irrelevant to the description are omitted for the simplicity of explanation, and the size, form and shape of each component illustrated in the drawings can be modified in various ways. Like reference numerals denote like parts through the whole document.

Suffixes "module" and "unit" used for components disclosed in the following description are merely intended for easy description of the specification, and the suffixes themselves do not give any special meaning or function. Further, in the following description of the present disclosure, a detailed explanation of known related technologies may be omitted to avoid unnecessarily obscuring the subject matter of the present disclosure.

Throughout this document, the term "connected to (contacted with or coupled to)" may be used to designate a connection or coupling of one element to another element and includes both an element being "directly connected to (contacted with or coupled to)" another element and an element being "electronically connected to (contacted with or coupled to)" another element via another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Further, in describing components of the present disclosure, ordinal numbers such as first, second, etc. can be used only to differentiate the components from each other, but do not limit the sequence or relationship of the components. For example, a first component of the present disclosure may also be referred to as a second component and vice versa.

FIG. 1 is a block diagram illustrating a configuration of an image-based animal object condition identification apparatus according to an embodiment of the present disclosure.

Referring to FIG. 1, an image-based animal object condition identification apparatus 100 includes a communication module 110, a memory 120 and a processor 130 and may further include a database 140. The image-based animal object condition identification apparatus 100 receives images from a plurality of CCTVs installed at a shed in real time, detects an animal object by using the received images and detects the condition of the animal based on the animal detection information.

To this end, the image-based animal object condition identification apparatus 100 may be implemented with a computer or portable device which can access a server or another device through a network. Herein, the computer may include, for example, a notebook, a desktop and a laptop equipped with a WEB browser. The portable devices may be, for example, a wireless communication device that ensures portability and mobility and may include all kinds of handheld-based wireless communication devices such as various smart phones, tablet PCs, smart watches, and the like.

The term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

The communication module 110 receives images of an object from one or more cameras. Herein, the object may include various classes of animal objects such as cows, pigs and dogs. The communication module 110 may include hardware and software required to transmit and receive a signal, such as a control signal or a data signal, through wired/wireless connection with other network devices.

The memory 120 stores therein a program configured to extract animal detection information from the images received through the communication module 110. Herein, the program configured to extract animal detection information extracts continuous animal detection information of each object by inputting the received images into an animal detection model that is trained based on learning data composed of animal images. Also, the program extracts animal condition information by inputting the continuous animal detection information of each object into an animal condition identification model constructed based on learning data in which animal condition information is matched with each class of each animal object. Details of the animal detection information and animal condition information will be described later.

Herein, the memory 120 may collectively refer to a non-volatile storage device that retains information stored therein even when power is not supplied and a volatile storage device that requires power to retain information stored therein. The memory 120 may function to temporarily or permanently store data processed by the processor 130. The memory 120 may include magnetic storage media or flash storage media in addition to the volatile storage device that requires power to retain information stored therein, but the present disclosure is not limited thereto.

The processor 130 executes the program configured to extract the animal condition information stored in the memory 120 and outputs the animal condition information about the object as a result of execution.

In an example, the processor 130 may be implemented as a microprocessor, a central processing unit (CPU), a processor core, a multiprocessor, an application-specific integrated circuit (ASIC) or a field programmable gate array (FPGA), but the scope of the present disclosure is not limited thereto.

The database 140 may store therein images taken with the cameras and received through the communication module 110 or various data for training of the animal condition identification model. In particular, images taken with the respective cameras installed at each shed may be distinguished and separately stored in the database 140. Also, the database 140 accumulatively stores the animal detection information and animal condition information extracted by the animal condition information extraction program, and the animal detection information and animal condition information can be used in various applications for monitoring an abnormal condition of an animal.

Figure 2:
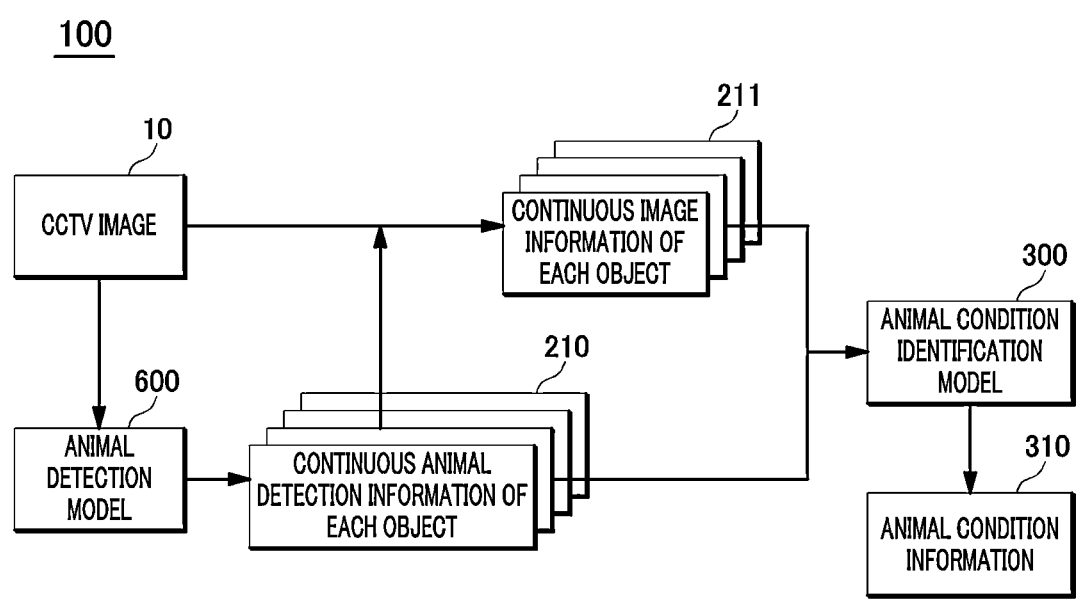
FIG. 2 is a block diagram provided to explain a process of outputting animal condition information by the image-based animal object condition identification apparatus according to an embodiment of the present disclosure.

FIG. 2 is a block diagram provided to explain a process of outputting animal condition information by the image-based animal object condition identification apparatus according to an embodiment of the present disclosure.

Referring to FIG. 2, the image-based animal object condition identification apparatus 100 extracts continuous animal detection information 210 of each object by inputting received images 10 into an animal detection model 600 that is trained based on learning data composed of animal images. Then, the image-based animal object condition identification apparatus 100 determines predetermined animal condition information 310 for each class of each animal object by inputting the continuous animal detection information 210 of each object into an animal condition identification model 30. Herein, the animal detection information 210 is extracted from n number of continuous entire images including at least one animal object, and includes n number of continuous object images 211 and n number of continuous object detection data corresponding to the respective object images 211.

Figure 3A:
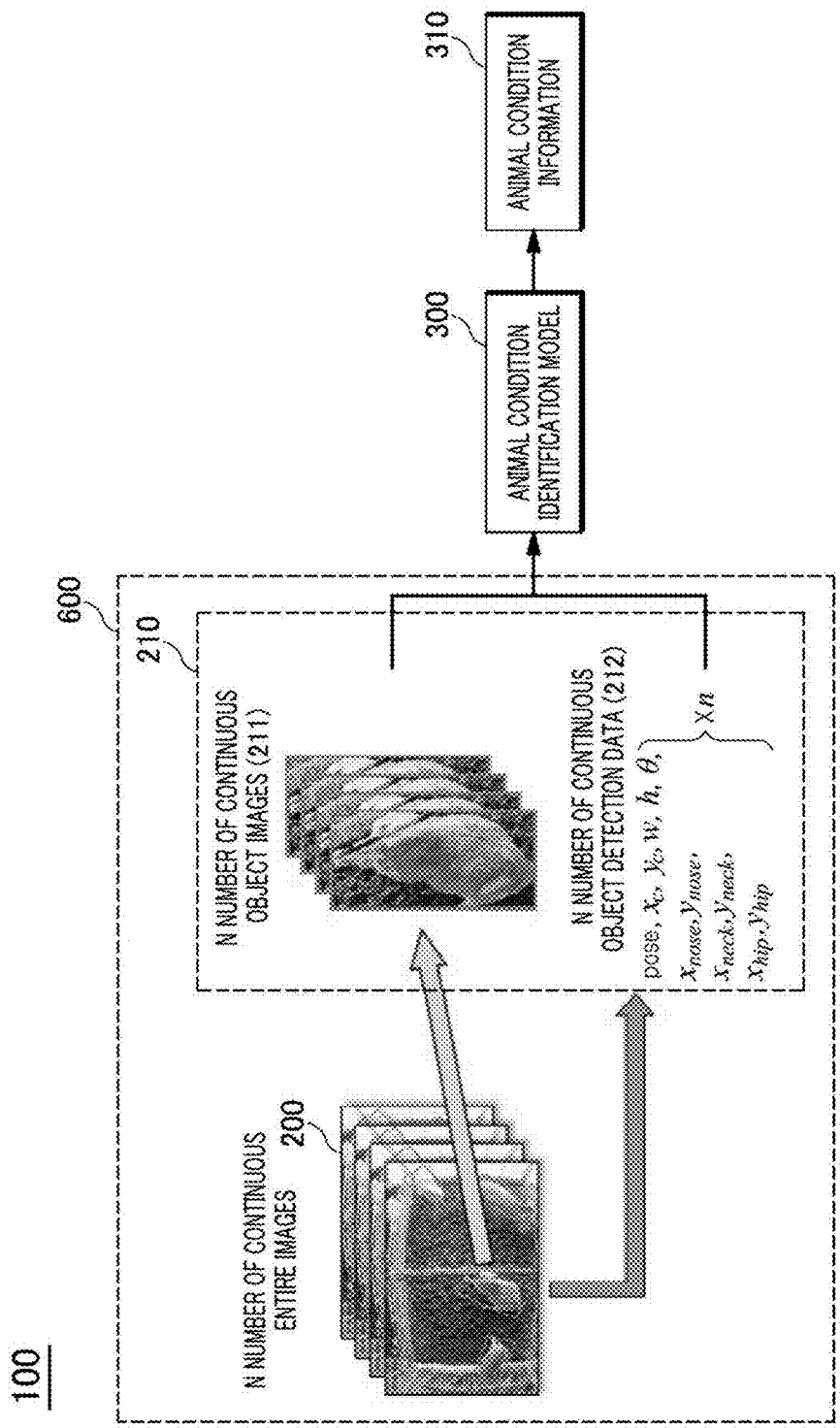
FIG. 3A is provided to explain animal detection information extracted by an animal detection model of the image-based animal object condition identification apparatus according to an embodiment of the present disclosure.

FIG. 3A is provided to explain animal detection information extracted by an animal detection model of the image-based animal object condition identification apparatus according to an embodiment of the present disclosure.

Figure 3B:
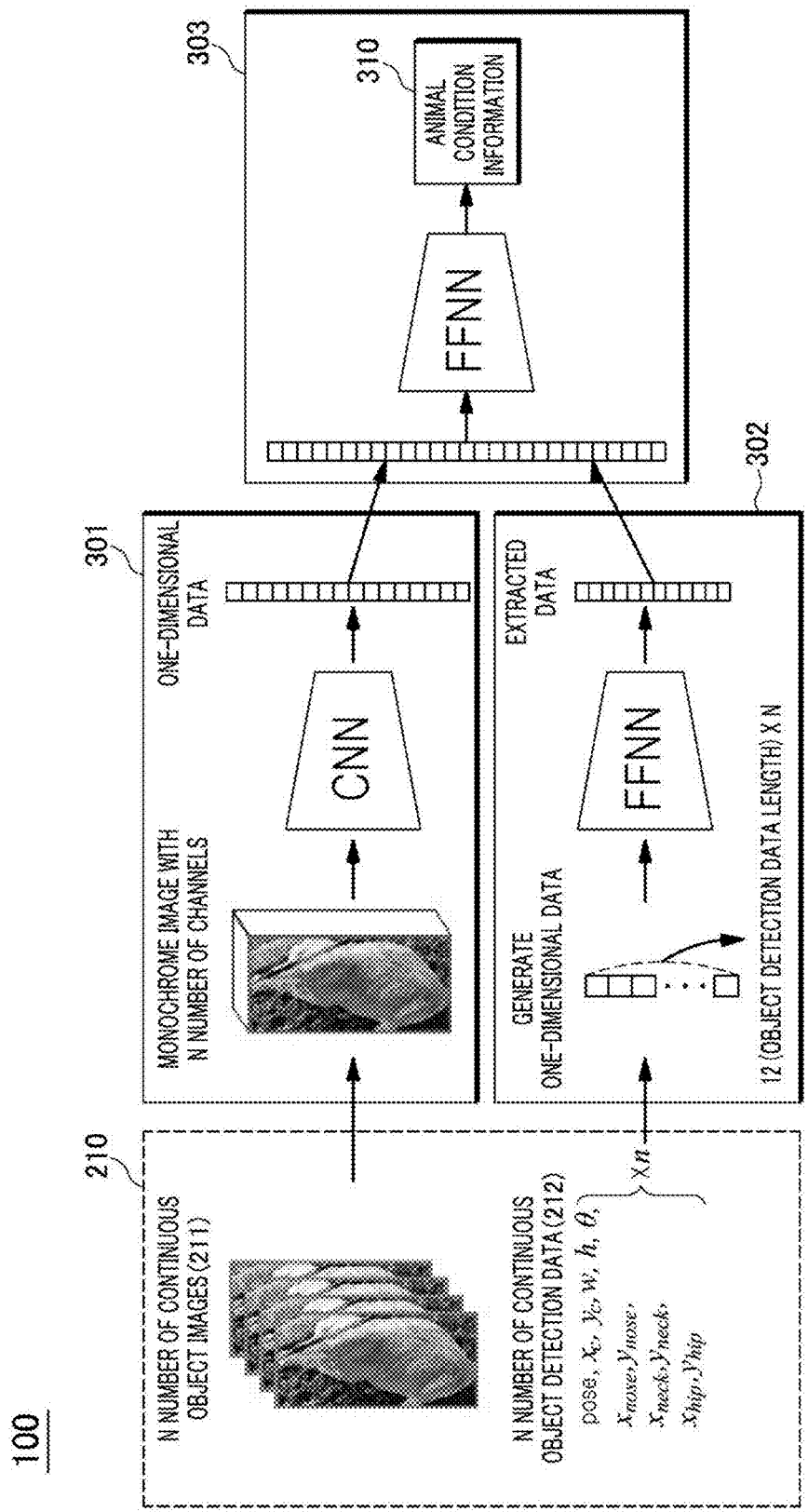

FIG. 3B and FIG. 3C are provided to explain an animal condition identification model of the image-based animal object condition identification apparatus according to an embodiment of the present disclosure.

Figure 5:
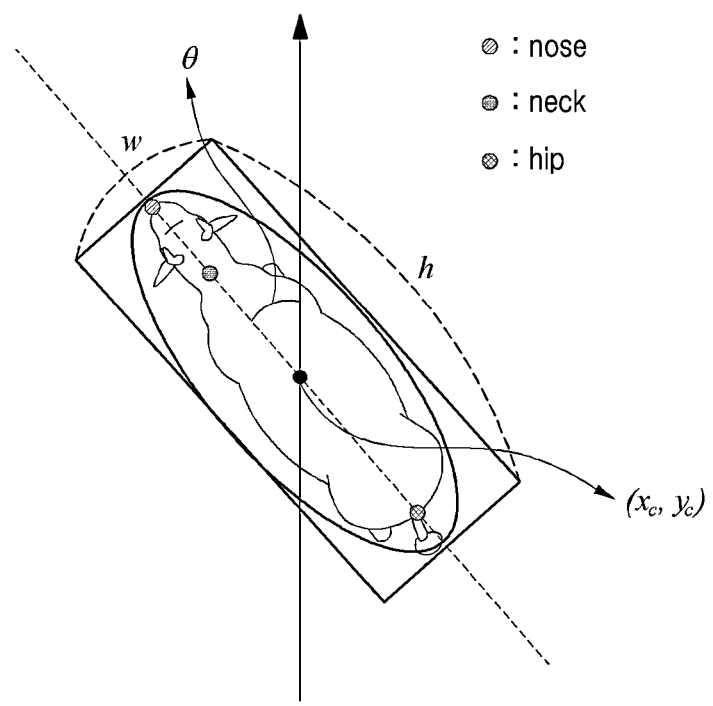

FIG. 4 and FIG. 5 are provided to explain animal detection information extracted by the animal detection model of the image-based animal object condition identification apparatus according to an embodiment of the present disclosure.

Hereafter, the animal detection model 600 that generates the animal detection information 210 will be described with reference to FIG. 3A, FIG. 4 and FIG. 5.

Referring to FIG. 3A, the animal detection information 210 is extracted from n number of continuous entire images 200 including at least one animal object. That is, the animal detection information 210 includes the n number of continuous object images 211 and n number of continuous object detection data 212 corresponding to the respective object images 211.

As shown in FIG. 4 and FIG. 5, the object detection data 212 refer to information about a bounding box (rbbox) created to be suitable for an animal object detected from the n number of continuous entire images 200. That is, the object detection data 212 include coordinates (xc, yc) of a central point of the bounding box, a width (w) of the bounding box, a length (h) of the bounding box and a rotational angle (theta) of the bounding box with respect to a reference axis.

Also, the object detection data 212 refer to information indicating keypoints of the animal object. That is, the object detection data 212 include a position (x1, y1) of the end of the head of the animal object, a position (x2, y2) of the neck and a position (xn, yn) of the end of the body.

The object detection data 212 may further include information about the class of the animal object detected from the images and information about a pose of the animal object. The information about the class of the animal object may distinguish different species of animals such as cows, pigs and dogs, but is not limited thereto. For example, the information about the class of the animal object may distinguish different growth stages of the same species. Pigs can be classified into suckling pigs, weaning pigs, growing pigs, fed pigs, candidate pigs, pregnant pigs and farrowing pigs. Also, the information about a pose of the animal object may distinguish various poses such as sitting, standing, mounting behavior, rollover, and dog sitting.

As shown in FIG. 3A, the object images 211 may be composed of images cropped to sizes of respective bounding boxes created to be suitable for the animal object detected from the n number of continuous entire images 200.

Examples of the object detection data 212 can be seen more clearly from FIG. 4. As described above, the bounding box of the present disclosure is created in consideration of the degree of rotation of the axis of the animal object as a detection target (i.e., an object), and, thus, the bounding box can be optimized for the size of the animal object.

Referring to FIG. 3A again, the animal detection model 600 of the present disclosure is constructed based on the n number of continuous entire images 200 including at least one animal object and learning data in which animal condition information is matched with each class of each animal object included in each of the continuous entire images 200. The animal detection model 600 is trained through a training process and then automatically extracts the animal detection information 210 including n number of continuous object images 211 from the n number of continuous entire images 200 and n number of continuous object detection data 212 corresponding to the respective object images 211 through an inference process on actually input images. A detailed configuration of the animal detection model 600 will be described later with reference to FIG. 6 through FIG. 8.

Hereafter, an animal condition identification model 300 that generates the animal condition information 310 will be described with reference to FIG. 3B and FIG. 3C.

Referring to FIG. 3A and FIG. 3B, the animal condition identification model 300 is constructed based on the n number of continuous entire images 200 including at least one animal object and learning data in which the animal condition information 310 is matched with each class of each animal object included in each of the continuous entire images 200.

By way of example, the animal condition identification model 300 includes a first feature extraction unit 301, a second feature extraction unit 302 and an output unit 303.

The first feature extraction unit 301 generates n number of one-dimensional image data by converting the n number of continuous object images 211 into monochrome images and generates feature data of a first length based on the one-dimensional image data by using a convolutional neural network (CNN). For example, the first feature extraction unit 301 can be further improved in performance by using ResNet or DenseNet, which is a CNN classifier model improved over the CNN.

The second feature extraction unit 302 generates n number of one-dimensional data of a second length by connecting the n number of continuous object detection data 212 and generates feature data of the second length based on the one-dimensional image data of the second length by using a first feed-forward neural network (FFNN).

The output unit 303 generates data of a third length by connecting the feature data of the first length and the feature data of the second length and outputs the animal condition information 310 based on the data of the third length by using a second FFNN.

Also, the output unit 303 is constructed to sort an abnormal condition from the animal condition information 310 for each class of each animal object by using the softmax function.

Referring to FIG. 3C, the animal condition information 310 is sorted by codes indicating abnormal conditions of animals including stop, walk, run, limp, delivery, excretion, heat, fell over, stuck, biting and nose rubbing.

For example, the second FFNN in the output unit 303 may finally generate, as an output value, the probability of each of the predefined animal condition information 310 as shown in FIG. 3C by using the softmax.

That is, an abnormal condition of a livestock animal is identified not with only one static datum as in the conventional technology, but with dynamic data, and, thus, it is possible to improve the identification accuracy. Also, various abnormal conditions of livestock animals ranging from short-term animal condition information such as walk, run and limp to long-term animal condition information such as delivery and disease can be identified depending on the number of continuous entire images.

Hereafter, the animal detection model 600 that generates the animal detection information 210 will be described.

Figure 6:
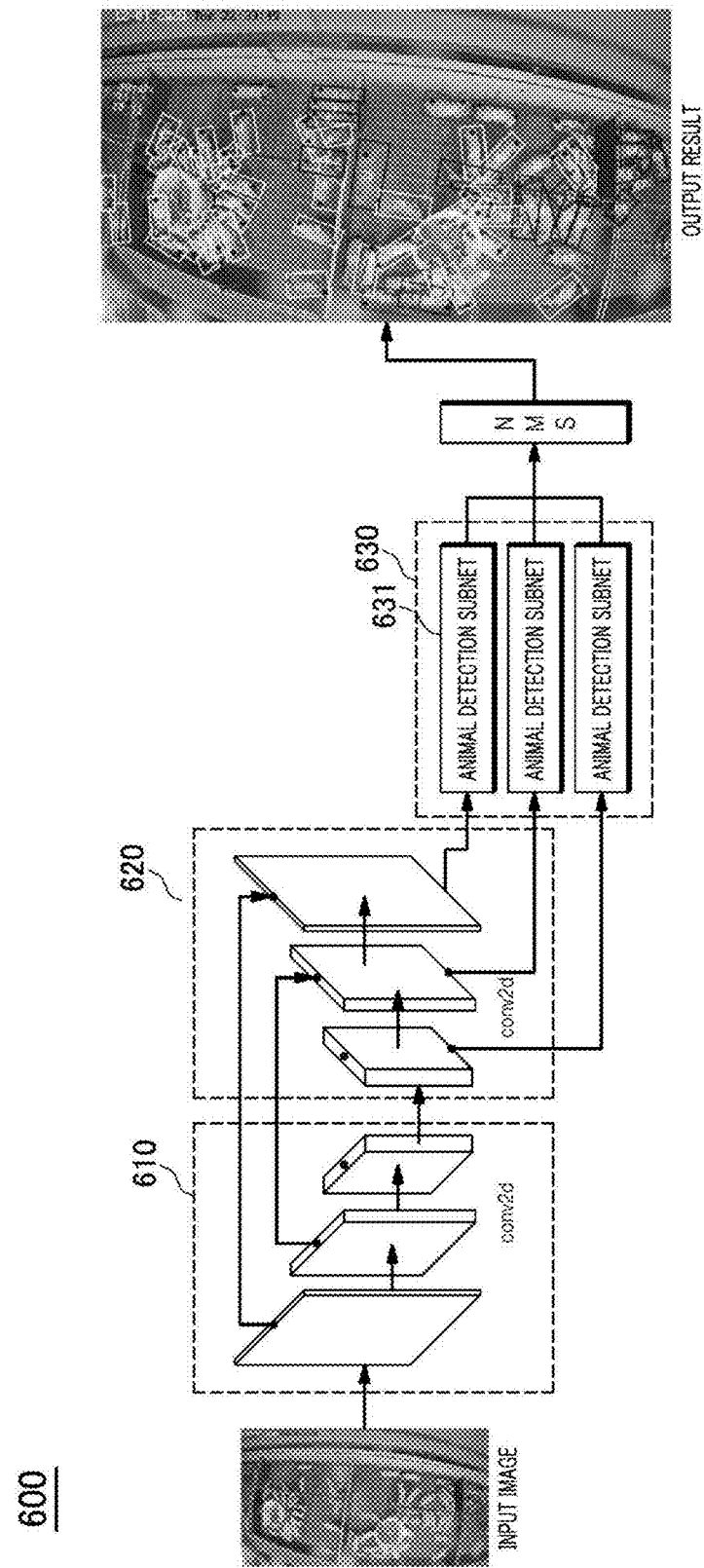
FIG. 6, FIG. 7 and FIG. 8 are provided to explain an animal detection model of the image-based animal object condition identification apparatus according to an embodiment of the present disclosure.
Figure 7:
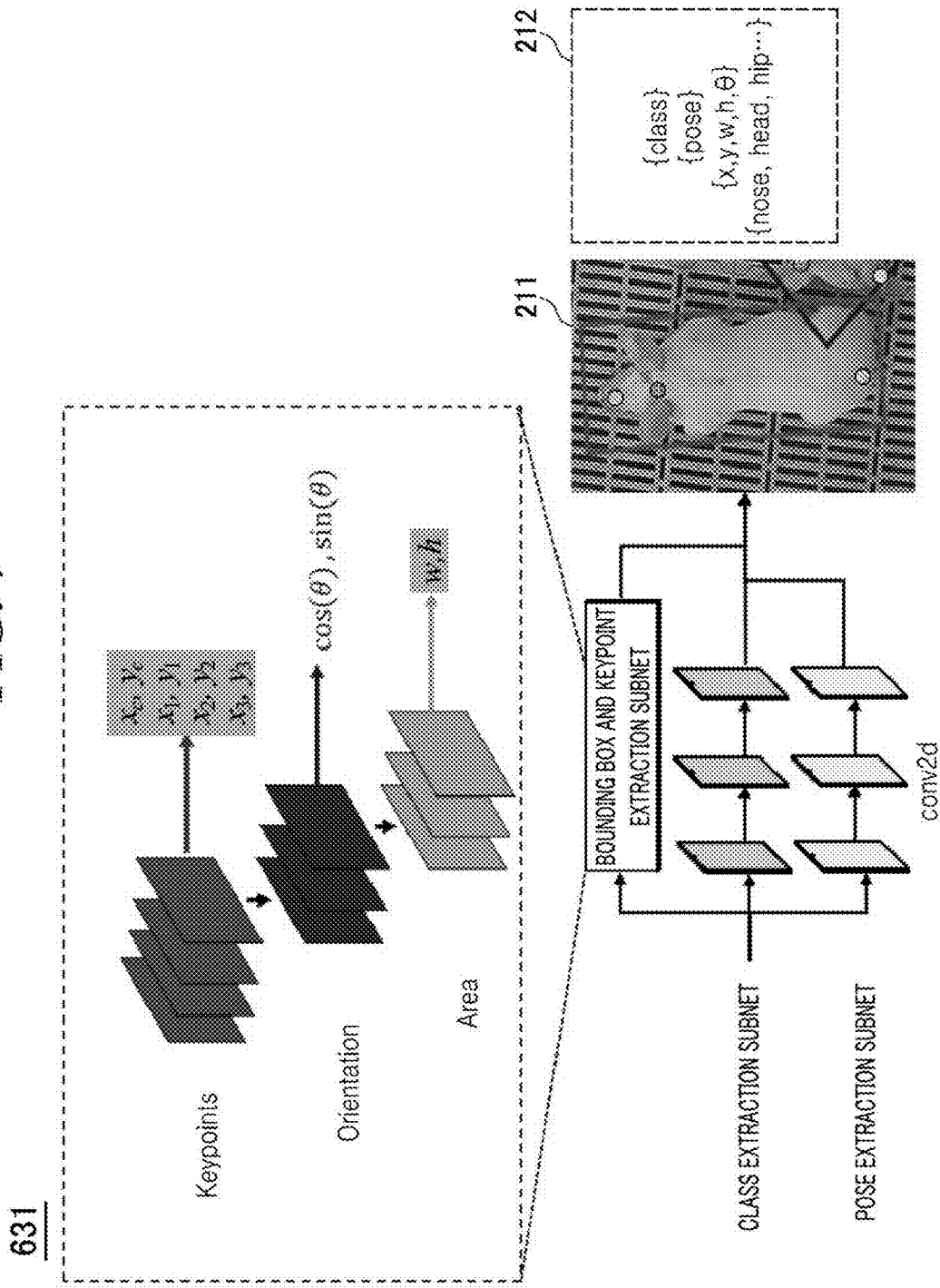
Figure 8:
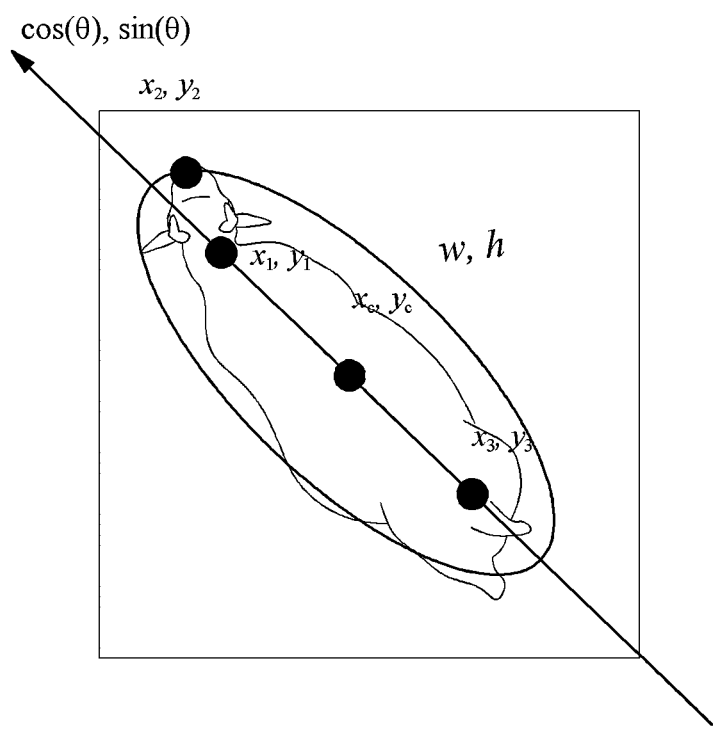

FIG. 6, FIG. 7 and FIG. 8 are provided to explain an animal detection model of the image-based animal object condition identification apparatus according to an embodiment of the present disclosure.

The animal detection model 600 includes a backbone 610, a neck 620 and a head 630.

The backbone 610 is a component configured to extract a feature from the input image and commonly used for deep neural network-based image analysis and processing. The backbone 610 is mainly configured as a stack of 2D convolution layers as illustrated in FIG. 6, and has been improved to have various neural network structures in order to improve the efficiency thereof. Backbones of various structures commonly function to receive an image and extract intermediate information. The intermediate information is delivered to the neck 620.

The neck 620 collects the intermediate information from each layer of the backbone 610 based on the feature extracted by the backbone 610. The neck 620 is a lower neural network forming a universal object detector and functions to collect the intermediate information from each layer of the backbone 610 and analyze the intermediate information. The image analyzed in each layer has different resolutions. Thus, if an object is a long or short distance away, the neck 620 extracts intermediate information from each layer to effectively detect animals of various sizes and provides the intermediate information to the head 630. The neck 620 may have various configurations depending on the form of the backbone 610. Specifically, the number of layers of a neural network forming the neck 620 and a hyperparameter for each layer may vary depending on the form of the backbone 610.

The head 630 outputs object detection information based on the intermediate information collected by the neck 620. The head 630 receives the intermediate information acquired by the neck 620 and outputs animal detection information. The head 630 receives the intermediate information from each layer of the neck 620 and outputs the animal detection information recognized by each layer. In particular, the head 630 of the present disclosure includes a plurality of animal detection subnets 631, and each animal detection subnet 631 includes a subnet for extracting a bounding box and a keypoint, a subnet for extracting a class of an animal and a subnet for extracting a pose of an animal as shown in FIG. 7. That is, the animal detection model 600 may extract the n number of continuous object images 211 and the n number of continuous object detection data 212 corresponding to the respective object images 211 by means of each animal detection subnet 631.

Meanwhile, a non-maximum suppression (NMS) module may be further coupled to an output end of the head 630. The NMS refers to an algorithm for selecting a bounding box with the highest similarity when several bounding boxes are created for the same object. Since it is a conventional technology, a detailed description thereof will be omitted.

The subnet for extracting a bounding box and a keypoint is composed of cascaded multi-lane deep convolutional networks. The cascaded multi-lane deep convolutional networks are constructed according to a causal order for extracting a bounding box and a keypoint for a given animal image. Each of the object detection data 212 is defined from each image according to the following causal order.

That is, as shown in FIG. 8, a central point (xc, yc) and major points ((x1, y1), (x2, y2), (x3, y3)) are marked first. Then, a tangent line passing through the central point and one or more of the major points is drawn. Finally, an area (plane) with the tangent line passing through its center is defined.

In the cascaded multi-lane deep convolutional networks constructed as described above, information is delivered according to the causal order and each information is output. That is, a first lane outputs the central point and the keypoint, a second lane outputs a direction (theta) of the tangent line, and a third lane outputs a width and a height of the area including the tangent line and the central point.

The learning data used in the training process of the animal detection model 600 include a plurality of images and the animal detection information 210 matched with each image. Herein, the animal detection information 210 is manually extracted from each image. That is, when an operator sees each image, the operator may use an appropriate SW tool to directly input the animal detection information 210, or the animal detection information 210 may be automatically input by an already developed animal detector and then corrected or supplemented by the operator. For example, the operator displays a bounding box in consideration of a rotational direction of an animal object with respect to a reference axis for each animal object included in an image and creates coordinates of a central point of each bounding box, a width of the bounding box, a length of the bounding box and a rotational angle of the bounding box with respect to a reference axis. Also, the operator extracts information about the class or pose of the animal object and uses the information as learning data.

Hereafter, description of the same components as those shown in FIG. 1 through FIG. 8 will be omitted.

Figure 9:
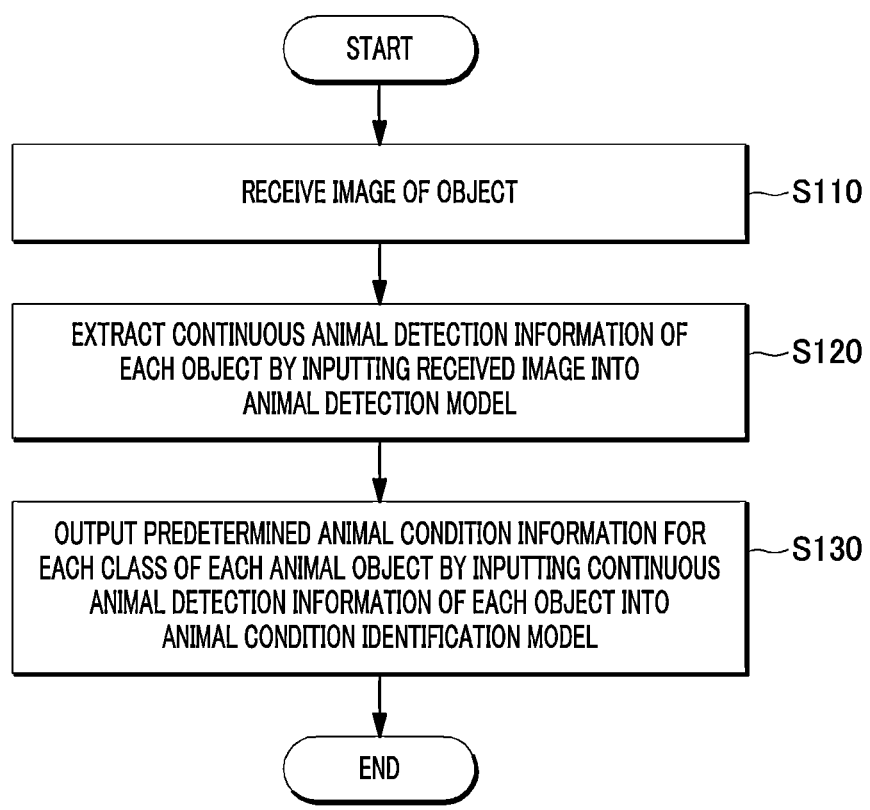
FIG. 9 is a flowchart illustrating a method for identifying the condition of an animal object by using the image-based animal object condition identification apparatus according to an embodiment of the present disclosure.

FIG. 9 is a flowchart illustrating a method for identifying the condition of an animal object by using the image-based animal object condition identification apparatus according to an embodiment of the present disclosure.

Referring to FIG. 9, the method for identifying the condition of an animal object by using the image-based animal object condition identification apparatus includes: a process of receiving the image 10 of an object (S110); a process of extracting the continuous animal detection information 210 of each object by inputting the received image into the animal detection model 600 that is trained based on learning data composed of animal images (S120); and a process of outputting the predetermined animal condition information 310 for each class of each animal object by inputting the continuous animal detection information 210 of each object into the animal condition identification model 300 (S130). The animal detection information 210 is extracted from the n number of continuous entire images 200 including at least one animal object, and includes the n number of continuous object images 211 and the n number of continuous object detection data 212 corresponding to the respective object images 211.

The object detection data 212 refer to information about a bounding box created to be suitable for an animal object detected from each of the n number of continuous entire images 200. That is, the object detection data 212 include coordinates of a central point of the bounding box, a width of the bounding box, a length of the bounding box and a rotational angle of the bounding box with respect to a reference axis. Also, the object detection data 212 refer to information indicating keypoints of the animal object. That is, the object detection data 212 include a position of the end of the head of the animal object, a position of the neck and a position of the end of the body.

The object images 211 are composed of images cropped to sizes of respective bounding boxes created to be suitable for the animal object detected from each of the n number of continuous entire images 200.

The animal condition identification model 300 is constructed based on the n number of continuous entire images 200 including at least one animal object and learning data in which the animal condition information is matched with each class of each animal object included in each of the continuous entire images 200.

The animal condition identification model 300 generates n number of one-dimensional image data by converting the n number of continuous object images 211 into monochrome images. The animal condition identification model 300 includes the first feature extraction unit 301 that generates feature data of a first length based on the one-dimensional image data by using a convolutional neural network (CNN). The animal condition identification model 300 includes the second feature extraction unit 302 that generates n number of one-dimensional data of a second length by connecting the n number of continuous object detection data 212 and generates feature data of the second length based on the one-dimensional image data of the second length by using a first feed-forward neural network (FFNN). The animal condition identification model 300 includes the output unit 303 that generates data of a third length by connecting the feature data of the first length and the feature data of the second length and outputs the animal condition information 310 based on the data of the third length by using a second FFNN.

The animal object condition identification method described above can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

It would be understood by a person with ordinary skill in the art that various changes and modifications may be made based on the above description without changing technical conception and essential features of the present disclosure. Thus, it is clear that the above-described embodiments are illustrative in all aspects and do not limit the present disclosure. The scope of the present disclosure is defined by the following claims. It shall be understood that all modifications and embodiments conceived from the meaning and scope of the claims and their equivalents are included in the scope of the present disclosure.

EXPLANATION OF REFERENCE NUMERALS

100: Image-based animal object condition identification apparatus
110: Communication module
120: Memory
130: Processor
140: Database

We claim:

1. An image-based animal object condition identification apparatus, comprising:
a communication module that receives an image of an object;
a memory that stores therein a program configured to extract animal condition information from the received image; and
a processor that executes the program,
wherein the program extracts continuous animal detection information of each object by inputting the received image into an animal detection model that is trained based on learning data composed of animal images and outputs predetermined animal condition information for each class of each animal object by inputting the continuous animal detection information of each object into an animal condition identification model, and
the animal detection information is extracted from n number of continuous entire images including at least one animal object, and includes n number of continuous object images and n number of continuous object detection data corresponding to the respective object images,
wherein the animal condition identification model is constructed based on the n number of continuous entire images including at least one animal object and learning data in which the animal condition information is matched with each class of each animal object included in each of the continuous entire images, and the animal condition identification model includes:
a first feature extraction unit that generates n number of one-dimensional image data by converting the n number of continuous object images into monochrome images and generates feature data of a first length based on the one-dimensional image data by using a convolutional neural network (CNN);

a second feature extraction unit that generates n number of one-dimensional data of a second length by connecting the n number of continuous object detection data and generates feature data of the second length based on the one-dimensional image data of the second length by using a first feed-forward neural network (FFNN); and an output unit that generates data of a third length by connecting the feature data of the first length and the feature data of the second length and outputs the animal condition information based on the data of the third length by using a second FFNN.

2. The image-based animal object condition identification apparatus of claim 1,
wherein the object detection data include, as information about a bounding box created to be suitable for the animal object detected from each of the n number of continuous entire images, coordinates of a central point of the bounding box, a width of the bounding box, a length of the bounding box and a rotational angle of the bounding box with respect to a reference axis and includes, as information indicating keypoints of the animal object, a position of the end of the head of the animal object, a position of the neck and a position of the end of the body, and the object images are composed of images cropped to sizes of the respective bounding boxes created to be suitable for the animal object detected from each of the n number of continuous entire images.

3. The image-based animal object condition identification apparatus of claim 1,
wherein the output unit is constructed to sort an abnormal condition from the animal condition information for each class of each animal object by using the softmax function, and the animal condition information is sorted by codes indicating abnormal conditions of animals including stop, walk, run, limp, delivery, excretion, heat, fell over, stuck, biting and nose rubbing.

4. The image-based animal object condition identification apparatus of claim 1,
wherein the program further extracts, as the object detection data, information about the class of the animal object detected from the image and information about a pose of the animal object.

5. The image-based animal object condition identification apparatus of claim 1,
wherein the animal detection model is constructed based on the n number of continuous entire images including at least one animal object and learning data in which the animal detection information is matched with the animal object included in each of the continuous entire images, and the animal detection model includes a backbone configured to extract a feature from the input image, a neck configured to collect intermediate information from each layer of the backbone based on the feature extracted by the backbone, and a head configured to output the animal detection information based on the intermediate information collected by the neck.

6. The image-based animal object condition identification apparatus of claim 5,
wherein the head of the animal detection model extracts a bounding box of the animal object and a keypoint of the animal object based on cascaded multi-lane deep convolutional networks, and the cascaded multi-lane deep convolutional networks are constructed to perform a process of extracting coordinates of a major keypoint, a process of extracting a direction of a tangent line passing through the coordinates of the major keypoint and a process of extracting a width and a height of an area including the tangent line and the major keypoint.

7. The image-based animal object condition identification apparatus of claim 5,
wherein the head of the animal detection model is constructed to extract each of information about the class of the animal object and information about a pose of the animal object based on a single-lane deep convolutional network.

8. A method for identifying a condition of an animal object based on an image by using an image-based animal object condition identification apparatus, comprising:
receiving an image of an object;
extracting continuous animal detection information of each object by inputting the received image into an animal detection model that is trained based on learning data composed of animal images; and
outputting predetermined animal condition information for each class of each animal object by inputting the continuous animal detection information of each object into an animal condition identification model,
wherein the animal detection information is extracted from n number of continuous entire images including at least one animal object, and includes n number of continuous object images and n number of continuous object detection data corresponding to the respective object images, and
wherein the animal condition identification model is constructed based on the n number of continuous entire images including at least one animal object and learning data in which the animal condition information is matched with each class of each animal object included in each of the continuous entire images, and
the animal condition identification model includes:
a first feature extraction unit that generates n number of one-dimensional image data by converting the n number of continuous object images into monochrome images and generates feature data of a first length based on the one-dimensional image data by using a convolutional neural network (CNN);
a second feature extraction unit that generates n number of one-dimensional data of a second length by connecting the n number of continuous object detection data and generates feature data of the second length based on the one-dimensional image data of the second length by using a first feed-forward neural network (FFNN); and
an output unit that generates data of a third length by connecting the feature data of the first length and the feature data of the second length and outputs the animal condition information based on the data of the third length by using a second FFNN.

9. The method for identifying a condition of an animal object based on an image of claim 8,
  wherein the object detection data include, as information about a bounding box created to be suitable for the animal object detected from each of the n number of continuous entire images, coordinates of a central point of the bounding box, a width of the bounding box, a length of the bounding box and a rotational angle of the bounding box with respect to a reference axis and includes, as information indicating keypoints of the animal object, a position of the end of the head of the animal object, a position of the neck and a position of the end of the body, and
  the object images are composed of images cropped to sizes of the respective bounding boxes created to be suitable for the animal object detected from each of the n number of continuous entire images.

10. The method for identifying a condition of an animal object based on an image of claim 8,
  wherein the output unit is constructed to sort an abnormal condition from the animal condition information for each class of each animal object by using the softmax function, and
  the animal condition information is sorted by codes indicating abnormal conditions of animals including stop, walk, run, limp, delivery, excretion, heat, fell over, stuck, biting and nose rubbing.

11. The method for identifying a condition of an animal object based on an image of claim 8,
  wherein in the process of extracting continuous animal detection information, information about the class of the animal object detected from the image and information about a pose of the animal object are further extracted as the object detection data.

12. The method for identifying a condition of an animal object based on an image of claim 8,
  wherein the animal detection model is constructed based on the n number of continuous entire images including at least one animal object and learning data in which the animal detection information is matched with the animal object included in each of the continuous entire images, and
  the animal detection model includes a backbone configured to extract a feature from the input image, a neck configured to collect intermediate information from each layer of the backbone based on the feature extracted by the backbone, and a head configured to output the animal detection information based on the intermediate information collected by the neck.

13. The method for identifying a condition of an animal object based on an image of claim 12,
  wherein the head of the animal detection model extracts a bounding box of the animal object and a keypoint of the animal object based on cascaded multi-lane deep convolutional networks, and
  the cascaded multi-lane deep convolutional networks are constructed to perform a process of extracting coordinates of a major keypoint, a process of extracting a direction of a tangent line passing through the coordinates of the major keypoint and a process of extracting a width and a height of an area including the tangent line and the major keypoint.

14. The method for identifying a condition of an animal object based on an image of claim 12,
  wherein the head of the animal detection model is constructed to extract each of information about the class of the animal object and information about a pose of the animal object based on a single-lane deep convolutional network.

15. A non-transitory computer-readable recording medium that stores therein a computer program configured to perform an image-based animal object condition identification method of claim 8.

* * * * *